United States Patent
Oligmueller

(10) Patent No.: US 6,202,790 B1
(45) Date of Patent: Mar. 20, 2001

(54) MULTIPLE SPEED LUBRICATION SYSTEM FOR A WORK VEHICLE

(75) Inventor: Jeffrey Oligmueller, Wichita, KS (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/416,316

(22) Filed: Oct. 12, 1999

(51) Int. Cl.[7] .................................................. F16N 7/38
(52) U.S. Cl. ............................. 184/6; 56/12.3; 60/494; 417/326
(58) Field of Search .................. 184/6, 6.14, 105.1; 56/12.3; 60/493, 494; 417/326

(56) References Cited

U.S. PATENT DOCUMENTS

| | | | |
|---|---|---|---|
| 2,232,428 | 2/1941 | Benedek | 60/465 |
| 2,961,829 | 11/1960 | Weisenbach | 60/464 |
| 3,258,022 * | 6/1966 | Thompson | 60/493 X |
| 3,300,969 * | 1/1967 | Barden | 60/493 X |
| 3,901,032 * | 8/1975 | Steiger et al. | 60/493 X |
| 4,531,368 | 7/1985 | Killen | 60/453 |
| 4,769,978 * | 9/1988 | Reichen et al. | 56/12.3 |
| 4,840,018 * | 6/1989 | Deutsch | 56/12.3 |
| 4,972,663 * | 11/1990 | Richman et al. | 56/12.3 |
| 5,018,343 * | 5/1991 | Finke | 56/12.3 X |
| 5,099,955 * | 3/1992 | Mangen et al. | 184/6 X |
| 5,137,117 * | 8/1992 | Mangen et al. | 56/12.3 X |
| 5,390,762 | 2/1995 | Nelson | 184/1.5 |

* cited by examiner

Primary Examiner—Charles A Marmor
Assistant Examiner—Ankur Parekh
(74) Attorney, Agent, or Firm—Foley & Lardner

(57) ABSTRACT

The present invention provides a lubrication system and method for a work vehicle having a lubricant reservoir and a lubricant using attachment that comprises a single bi-directional pump/motor set, a single three-position/four way control valve that directs hydraulic fluid, through one of two flow limiting devices, to the hydraulic motor to power the pump. In one mode the pump, at a slow rate of approximately one gallon per minute, moves lubricant from the reservoir to the attachment. In the other mode the pump, at a fast rate of approximately six gallons per minute, moves lubricant from a lubricant source to fill the lubricant reservoir. The flow limiting devices can be either a fixed flow rate device or a multiple flow rate device as selected by an operator of the work vehicle. The various positions of the control valve can be actuated by a solenoid, a hydraulic cylinder, a pneumatic cylinder or a cable, all of which can be operated from the cab of the work vehicle.

20 Claims, 4 Drawing Sheets

MULTIPLE SPEED LUBRICATION SYSTEM FOR A WORK VEHICLE

FIELD OF THE INVENTION

The present invention relates, generally, to lubrication systems for mechanical devices and more particularly, to a lubrication method and system which permits pumping lubricant, at different speeds, to an attachment coupled to a work vehicle or to pump lubricant to a reservoir on the work vehicle.

BACKGROUND OF THE INVENTION

Work vehicles, such as tractors, combines, and cotton harvesters, typically include or are coupled to various rotatably driven mechanisms for performing various functions. Such attachments typically require lubrication to facilitate their operation by reducing friction and wear of the various parts and components of such attachments.

For instance, a cotton harvester is provided with a number of harvesting units mounted, typically, at the front end of the harvester. Each harvesting unit has a rotatable harvesting mechanism which has individual lubricant or lubricant fittings to supply lubricant to the various picker bars, spindles, cam followers and drive shafts extending through the harvester unit. A drive gear arrangement located in the top of the harvester unit transmits power from a drive shaft to the drum and spindles. Each of these components require lubrication to operate properly and efficiently. Modern cotton harvesters can have as many as eight (8) row harvesting units mounted on the cotton harvester with each requiring lubrication as described above.

Several systems have been developed to provide lubricant to such attachments as described in U.S. Pat. No. 4,769,978 (issued to Reichen, et al.) which discloses a system requiring a pump to move lubricant from a reservoir to cotton harvesting drums and a separate additional pump for filling the reservoir with lubricant as the lubricant is used. Another approach is disclosed in U.S. Pat. No. 5,099,955 (assigned to the assignee of the present invention) which uses a single pump to move lubricant from a reservoir on an attachment to the cotton harvesting drums and it uses the same pump to fill the reservoir on the attachment from a source of lubricant, with the flow at the same rate in both directions. Filling the lubricant reservoir at the same rate of flow at which the lubricant is used by the attachment takes more time than desired by the operator. Using an additional pump is expensive and troublesome since a separate power supply is needed to operate the second pump. This latter system utilizes a plurality of valves to affect the directional change of the lubricant flow. The two systems described require multiple valves or multiple pumps operating at the same flow rates to move the lubricant as needed.

Thus, there remains a need to provide a lubrication system that can utilize a single pump for moving lubricant from a source of lubricant to fill a reservoir and to use the same pump to move lubricant from the reservoir to an attachment using such lubricant. There is also a need for providing a variation in the flow rates when the system is in the lubrication using mode, i.e., slow verses the lubrication fill mode, i.e., fast. It would also be advantageous to affect such transition between a lubrication mode to a fill mode with a minimum of valves.

SUMMARY OF THE INVENTION

The present invention provides a lubrication system for a work vehicle having a lubricant reservoir and a lubricant using attachment that comprises a bi-directional pump operatively connected to a bi-directional hydraulic motor as a pump-motor set. The pump is in fluid communication with the reservoir, the lubricant using attachment and a lubricant fill connector. A pair of flow limiting devices, which devices can be a fixed rate or a multiple flow rate, are in fluid communication with the bi-directional hydraulic motor to selectively regulate the speed of the motor. A single three position/four-way control valve is in fluid communication with each flow limiting device and a source of hydraulic fluid. The source of hydraulic fluid typically is already located on the work vehicle to which the lubricant using attachment is coupled. The control valve has an off position which prevents lubricant from moving in the system and a first position which facilitates fluid communication with the bi-directional hydraulic motor through one flow limiting device for operation of the bi-directional pump in a lubricant using attachment mode. The rate of flow of such flow limiting device can be within the range of between 0.5 gallons and 1.5 gallons per minute with the preferred embodiment having a flow rate of about one gallon per minute. A second position of the control valve facilitates fluid communication with the bi-directional hydraulic motor through the other flow limiting device for operation of the bi-directional pump in a lubricant reservoir fill mode. This flow limiting device typically is set between a range of zero and seven gallons per minute with the preferred embodiment having a flow rate of about six gallons per minute. The present invention allows a single hydraulic pump to be used at a faster rate of operation in the fill mode than the rate of flow in the lubrication use mode. The flow limiting devices can be either a fixed flow rate device or a multiple flow rate device as selected by an operator of the work vehicle which utilizes the present invention. The various positions of the control valve can be actuated by a solenoid, a hydraulic cylinder, a pneumatic cylinder or a cable, all of which can be operated from the cab of the work vehicle.

The present invention also presents a method for pumping lubrication, at different speeds, in one of a use mode and a fill mode for a work vehicle having a lubricant reservoir and a lubricant using attachment comprising the steps of providing a bi-directional pump in fluid communication with the reservoir, the attachment and a lubricant fill connector, with the pump connected to a hydraulic motor. The method also includes providing a pair of flow limiting devices in fluid communication with the motor as well as a control valve, with the control valve also in fluid communication with a source of hydraulic fluid. By moving the control valve to a first position the motor moves the pump in a direction that corresponds to a use mode to provide lubricant from the reservoir to the attachment. Moving the control valve to a second position facilitates the motor moving the pump in a fill mode to provide lubricant from a lubricant supply through the lubricant fill connector to the lubricant reservoir thereby filling the lubricant reservoir. The operator of the work vehicle selects the flow rates of the flow limiting device such that the fill mode is faster than the use mode. The operator can also move the control valve to an off position when the pump is not needed to pump lubricant. The operator of the work vehicle can move the control valve by operating an actuator which is operatively connected to the control valve.

Other features and advantages of the present invention will become readily apparent from the following detailed description, appended drawings and accompanying claims.

Figure 1:
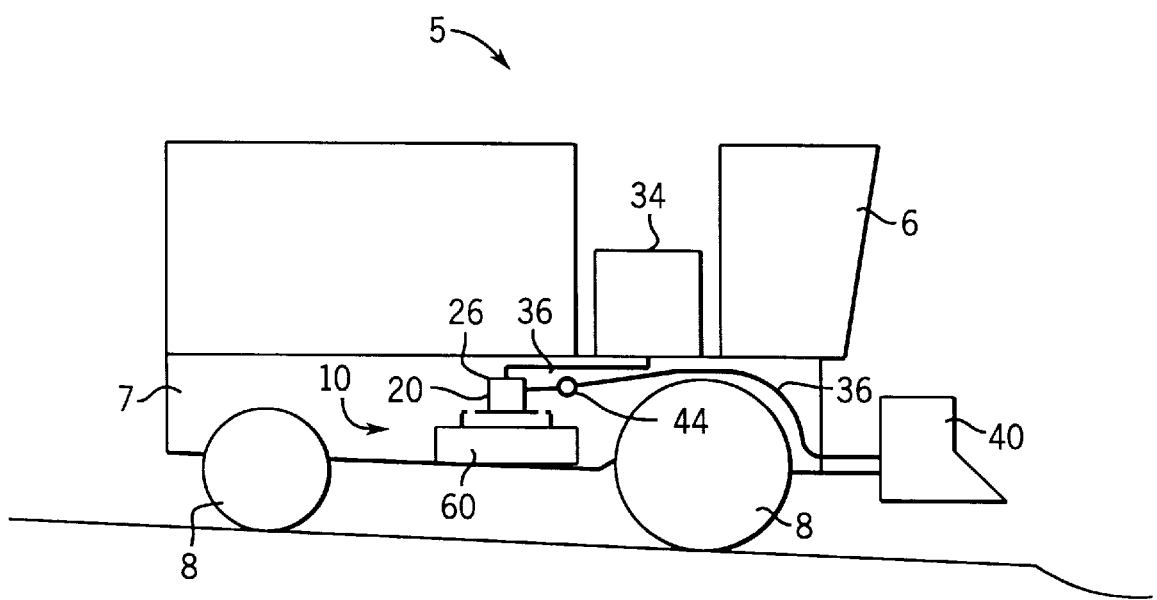
FIG. 1 is a side view of a work vehicle with an embodiment of the present lubrication system mounted thereon.

Before explaining the preferred embodiment of the invention in detail, it is to be understood that the invention is not limited in the application to the details of construction and the arrangement of components set forth in the following description or as illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTIONS OF PREFERRED EMBODIMENTS

Referring to FIG. 1 there is illustrated a work vehicle 5 comprising a vehicle support structure 7 upon which are rotatably mounted a plurality of wheels 8 for movement on the ground. The work vehicle 5 has a cab 6 in which an operator controls the movement and various functions of the attachments coupled to or mounted on the work vehicle 7. The particular work vehicle 5 depicted is a cotton harvester having at least one cotton picker attachment. The attachment 40 is a lubricant or lubricant using attachment. The lubricant is carried by the work vehicle 5 in a reservoir 34 which is supported by the vehicle support structure 7. Interconnected between the lubricant reservoir 34 and the lubricant using attachment 40 is a multiple speed lubrication system 10.

Figure 2:
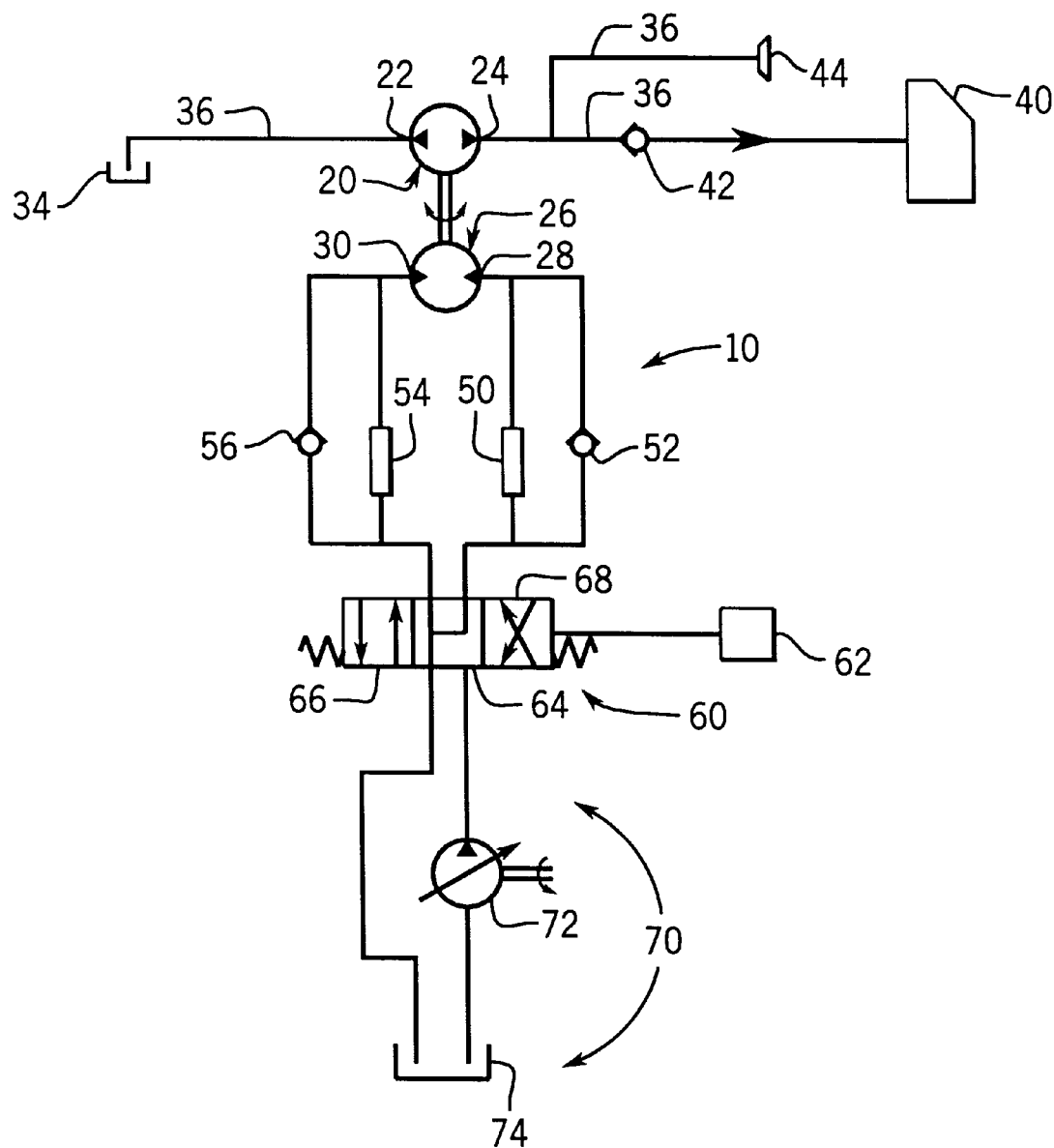
FIG. 2 is a schematic representation of an embodiment of the present lubrication system including the three positions/four-way control valve in an off position.
Figure 3:
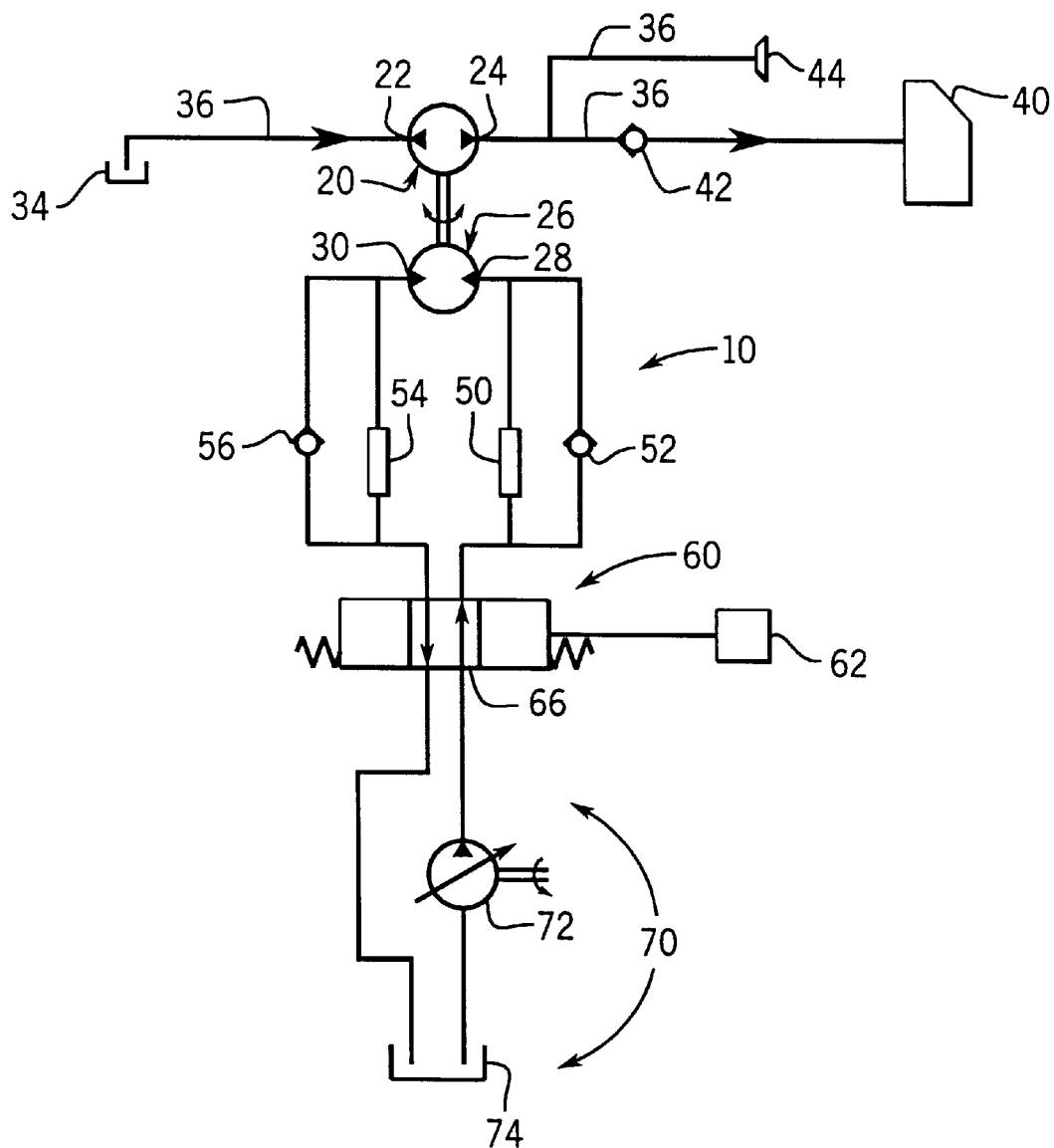
FIG 3 is a schematic representation of an embodiment of the present lubrication system with the control valve in the first position showing lubricant moving from the reservoir to the lubricant using attachment.
Figure 4:
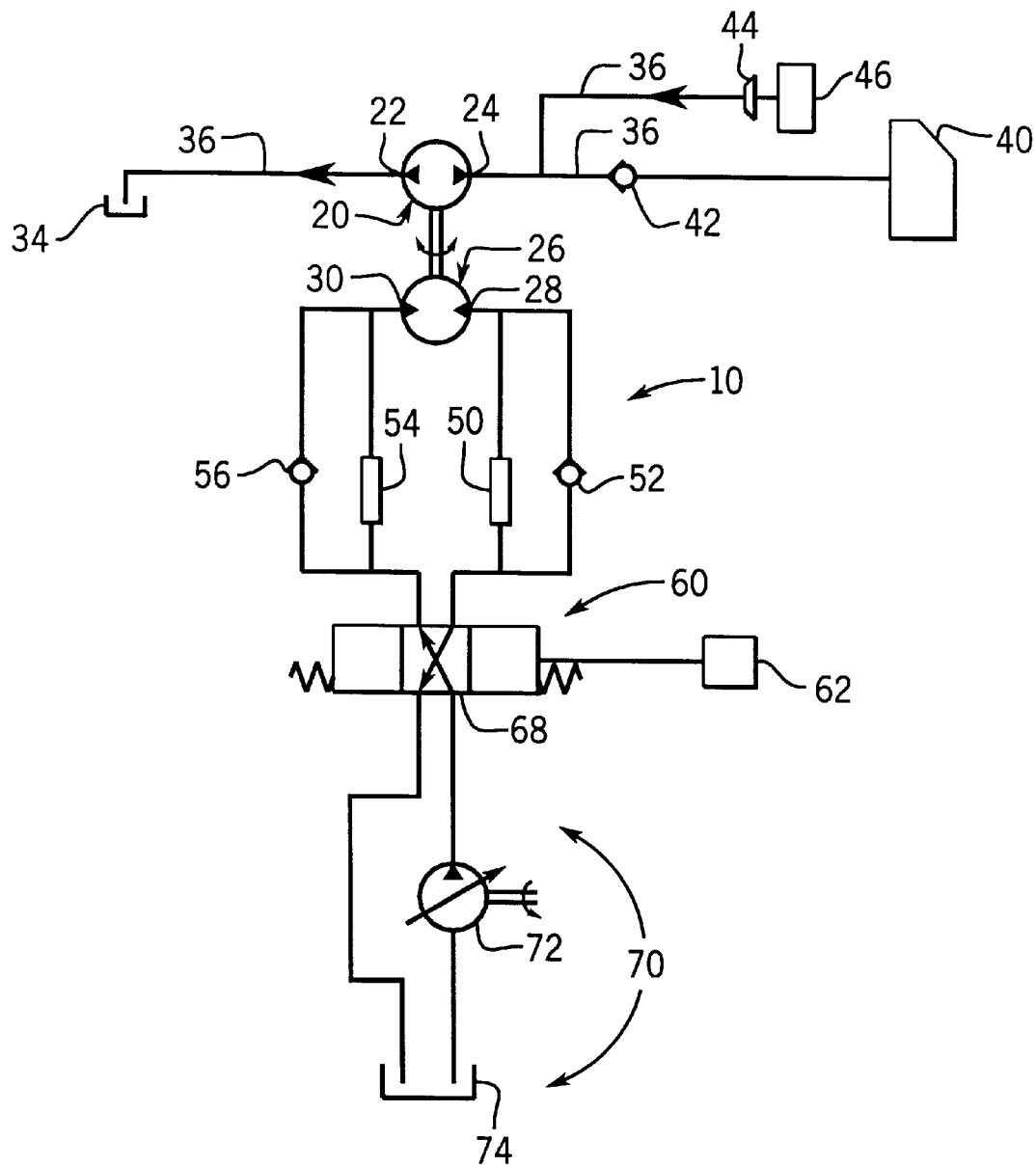
FIG. 4 is a schematic representation of an embodiment of the present lubrication system with the control valve in the second position with the lubricant moving from a lubricant source into the lubricant reservoir.

The multiple speed lubrication system 10 of the present invention comprises a bi-directional pump 20 operatively connected to a bi-directional hydraulic motor 26 with the bi-directional pump 20 in fluid communication with the reservoir 34, the attachment 40 and a lubricant-fill connector 44. The bi-directional pump is provided with at least a first port 22 and a second port 24 for facilitating the various connections. As shown in FIGS. 2, 3 and 4, the first port 22 is in fluid communication with the reservoir 34 through a hose or conduit 36 and the second port 24 is in fluid communication with the attachment 40 and the lubricant-fill connector 44, also by hose or conduit 36. A check valve 42 is located between the multi-directional pump 20 and the attachment 40 to help control the lubricant flow between the pump 20 and the attachment 40.

The bi-directional hydraulic motor 26, as shown in FIGS. 2, 3 and 4 is provided with a first port 28 and a second port 30. The ports are in fluid communication with a pair of flow limiting devices 50, 54 which selectively regulate the speed of the motor 26.

The multiple speed lubrication system 10 of the present invention also includes a single control valve 60 which is a three position/four way valve. FIG. 2 illustrates the control valve 60 in the off position 64 and also illustrates the connections for a first position 66 and a second position 68. FIG. 3 depicts the control valve 60 in its first position 66 and FIG. 4 depicts the control valve 60 in the second position 68. When the control valve 60 is in the off position 64 hydraulic fluid from a source 70 does not flow into the multiple speed lubrication system 10. The source of hydraulic fluid 70, which usually is a part of the work vehicle 5, typically includes a hydraulic fluid sump 74 and a hydraulic fluid pump 72.

When the control valve 60 is in its first position 66, as shown in FIG. 3, hydraulic fluid from a source of hydraulic fluid 70 moves through the control valve 60 and into a flow limiting device 50 for operation of the bi-directional pump 26 in a lubricant-using attachment mode. In that configuration, the lubricant from the reservoir 34 is pumped through the conduit 36 into pump port 22 and out pump port 24 through additional conduit 36 to the lubricant-using attachment 40 coupled to the work vehicle 5. In a cotton harvester, the lubricant-using attachment usually is a cotton picker having a plurality of gears, picker bars and spindles, all of which consume lubricant during their operation. The hydraulic fluid flowing through the bi-directional hydraulic motor 26 then returns to the hydraulic fluid source 70 through a check valve 56 and the return channel in the control valve 60.

When, as depicted in FIG. 4, the control valve 60 is in the second position 68, hydraulic fluid from the source of hydraulic fluid 70 moves through the control valve 60 to the other flow limiting device 54 for operation of the bi-directional pump 26 in a lubricant reservoir fill mode. In that alignment, the hydraulic motor 26 moves in a direction opposite the direction it moved when the control valve 60 was in the first position 66 with a corresponding directional change of the bi-directional pump 20. The lubricant then moves from a lubrication source 46 through the lubricant-fill connector 44 connected to pump port 24 out pump port 22 through the conduit 36 into the lubricant reservoir 34. Hydraulic fluid passing through the bi-directional hydraulic motor 26 returns to the source of hydraulic fluid 70 through the check valve 52 line and the return channel in the control valve 60.

In the lubricant-using attachment mode it is desirable to have the lubricant flow at a rate between zero and one gallon per minute. The flow limiting device 50 is set within that range with the preferred embodiment having a flow rate equal to one gallon per minute. When the multiple speed lubrication system 10 is in the lubricant reservoir fill mode, the other flow limiting device 54 is set to a faster flow rate to facilitate movement of lubricant from a lubricant/lubrication storage site 46 into the lubricant reservoir 34; therefore, the other flow limiting device 54 is set for a flow rate between zero and seven gallons per minute with the preferred embodiment having a flow rate of six gallons per minute. The lubricant/lubrication storage site 46 can be any conventional and convenient site and usually is a barrel located proximately to the work vehicle 5 or is brought to the work vehicle by a separate vehicle.

The flow limiting devices 50, 54 can be a fixed flow rate device, i.e., rates fixed at one gallon per minute and six gallons per minute or some other appropriate rates determined by the operator; or they can be multiple flow rate devices in which the operator of the work vehicle 5 can set the flow rate in either or both of the flow limiting devices 50, 54. The control valve 60 can be actuated by an actuator 62 between the off position 64, the first position 66 and the second position 68 of the control valve 60. The actuator 62 can be selected from a group comprising a solenoid, a hydraulic cylinder, a pneumatic cylinder and a cable. The various controls and circuits necessary to operate any one of these actuators can be of any conventional and convenient method typically controlled by the operator of the work vehicle 5 from the cab 6.

In operation, the present invention provides a system and a method for pumping lubrication (lubricant), at different speeds, in one of a use mode and a fill mode for a work vehicle 5 having a lubricant reservoir 34 and a lubricant-using attachment 40. This method comprises providing a bi-directional pump 20 which is in fluid communication with the reservoir 34, the attachment 40 and a lubricant-fill connector 44. The method also includes a step of providing a bi-directional hydraulic motor 26 which is operatively connected to the pump 20 and a pair of flow limiting devices 50, 54 which are in fluid communication with the motor 26. Control of the hydraulic fluid flow to the motor 26 is provided by a control valve 60 which is in fluid communication with each flow limiting device 50, 54 and a source of hydraulic fluid 70. By moving the control valve 60 to a first position 66, hydraulic fluid flow is facilitated to the motor 26 through one flow limiting device 50 for operation of the pump 20 in the use mode to provide lubricant from the reservoir 34 to the attachment 40. By moving the control valve 60 to a second position 68, hydraulic fluid flow is facilitated to the motor 26 through the other flow limiting device 54 for operation of the pump 20 in the fill mode to provide lubricant from a lubricant supply 46 through the lubricant-fill connector 44 to the lubricant reservoir 34. By moving the control valve 60 to an off position 64 when the pump 20 is not needed to pump lubricant flow of hydraulic fluid to the motor 26 is stopped. The rate of flow of the hydraulic fluid through the motor 26 which controls its speed is governed by the flow limiting devices 50, 54 which can be a fixed rate flow or a variable rate flow device. Control of the hydraulic motor 26 speed correspondingly controls the speed of the pump 20 such that the fill mode allows faster fluid flow than the flow limiting device for operating the pump 20 in the use mode. The preferred embodiment of the present invention has the lubricant use mode having a lubricant flow from the reservoir 34 to the attachment 40 at the rate of one gallon per minute and in the lubricant reservoir fill mode of having the lubricant flow from the lubricant supply 44 to the reservoir 34 at the rate of six gallons per minute. It should be understood that the flow rates can be within a range of between zero and seven gallons per minute with the operator of the work vehicle 5 controlling or setting the flow rates from the cab 6. The steps of moving the control valve 60 from the off position 64 to the first position 66 and the second position 68 can be accomplished by use of an actuator 62 which can be controlled by the operator of the work vehicle 5 from the cab 6.

Although the invention has been described in conjunction with specific embodiments thereof, it is evident that many alternatives, modifications and variations will be apparent to those ordinarily skilled in the art. Accordingly, it is intended to embrace all such alternatives, modifications and variations that fall within the spirit and scope of the appended claims.

What is claimed is:

1. A lubrication system for a work vehicle having a lubricant reservoir and a lubricant-using attachment, the multiple speed lubrication system comprising:
    a bi-directional pump operatively connected to a bi-directional hydraulic motor, with the bi-directional pump in fluid communication with the reservoir, the attachment and a lubricant fill connector;
    a pair of flow-limiting devices in fluid communication with the bi-directional hydraulic motor to selectively regulate the speed of the motor; and
    a control valve in fluid communication with each flow limiting device and a source of hydraulic fluid, with the control valve having an off position, a first position which facilitates fluid communication with the bi-directional hydraulic motor through one flow limiting device for operation of the bi-directional pump in a lubricant-using attachment mode and a second position which facilitates fluid communication with the bi-directional hydraulic motor through the other flow limiting device for operation of the bi-directional pump in a lubricant reservoir-fill mode.

2. The lubrication system of claim 1, wherein the flow limiting device for operating the pump in the fill mode allows faster fluid flow than the flow limiting device for operating the pump in the use mode.

3. The lubrication system of claim 2, wherein the flow-limiting device is one of a fixed flow rate device and a variable flow rate device.

4. The lubrication system of claim 1, wherein the control valve is operatively connected to an actuator for selective movement between the off position, the first position and the second position.

5. The lubrication system of claim 4, wherein the actuator is selected from a group consisting of: a solenoid, a hydraulic cylinder, a pneumatic cylinder and a cable.

6. The lubrication system of claim 3, wherein one flow limiting device has a fixed flow rate of between 0.5 gallons and 1.5 gallons per minute and the other flow limiting device has a fixed flow rate of between 5.5 gallons and 6.5 gallons per minute.

7. The lubrication system of claim 3, wherein each flow limiting device has a variable flow rate of between zero gallon per minute to seven gallons per minute.

8. A work vehicle comprising:
    a vehicle support structure;
    a plurality of wheels rotatably supported by the vehicle support structure;
    a lubricant-using attachment coupled to the vehicle support structure;
    a lubricant reservoir supported by the vehicle support structure; and,
    a lubrication system comprising:
        a bi-directional pump operatively connected to a bi-directional hydraulic motor, with the bi-directional pump in fluid communication with the reservoir, the attachment and a lubricant fill connector;
        a pair of flow-limiting devices in fluid communication with the bi-directional hydraulic motor to selectively regulate the speed of the motor; and
        a control valve in fluid communication with each flow limiting device and a source of hydraulic fluid, with the control valve having an off position, a first position which facilitates fluid communication with the bi-directional hydraulic motor through one flow limiting device for operation of the bi-directional pump in a lubricant-using attachment mode and a second position which facilitates fluid communication with the bi-directional hydraulic motor through the other flow limiting device for operation of the bi-directional pump in a lubricant reservoir-fill mode.

9. The work vehicle of claim 8, wherein the flow limiting device for operating the pump in the fill mode allows faster fluid flow than the flow limiting device for operating the pump in the use mode.

10. The work vehicle of claim 9, wherein the flow-limiting device is one of a fixed flow rate device and a variable flow rate device.

11. The work vehicle of claim 8, wherein the control valve is operatively connected to an actuator for selective movement between the off position, the first position and the second position.

12. The work vehicle of claim 11, wherein the actuator is selected from a group consisting of: a solenoid, a hydraulic cylinder, a pneumatic cylinder and a cable.

13. The work vehicle of claim 10, wherein one flow limiting device has a fixed flow rate between 0.5 gallons and 1.5 gallons per minute and the other flow limiting device has a fixed flow rate of between 5.5 gallons and 6.5 gallons per minute.

14. The work vehicle of claim 10, wherein each flow limiting device has a variable flow rate of between zero gallon per minute to seven gallons per minute.

15. A method for pumping lubrication, at different speeds, in one of a use mode and a fill mode for a work vehicle having a lubricant reservoir and a lubricant using attachment, the method comprising the steps of:

providing a bi-directional pump in fluid communication with the reservoir, the attachment and a lubricant fill connector;

providing a bi-directional hydraulic motor operatively connected to the pump;

providing a pair of flow limiting devices in fluid communication with the bi-directional motor;

providing a control valve in fluid communication with each flow limiting device and a source of hydraulic fluid;

moving the control valve to a first position which facilitates fluid communication with the motor through one flow limiting device for operation of the pump in the use mode to provide lubricant from the reservoir to the attachment;

moving the control valve to a second position which facilitates fluid communication with the motor through the other flow limiting device for operation of the pump in the fill mode to provide lubricant from a lubricant supply through the lubricant fill connector to the lubricant reservoir; and, moving the control valve to an off position when the pump is not needed to pump lubricant.

16. The method of claim 15, wherein the flow limiting device for operating the pump in the fill mode allows faster fluid flow than the flow limiting device for operating the pump in the use mode.

17. The method of claim 16, wherein the flow limiting device is of a fixed rate device and a variable flow rate device.

18. The method of claim 17, wherein one flow limiting device has a fixed flow rate of between 0.5 gallons and 1.5 gallons per minute and the other flow limiting device has a fixed flow rate of between 5.5 and 6.5 gallons per minute.

19. The method of claim 17, wherein each flow limiting device has a variable flow rate of between zero gallon per minute to seven gallons per minute, including the step of an operator of the work vehicle selecting the rate of flow.

20. The method of claim 15, wherein the control valve is operatively connected to an actuator for selectively moving the valve between the off position, the first position and the second position.

* * * * *